July 21, 1942.

R. O. BENDER

Re. 22,136

REFINING OF OIL

Original Filed July 24, 1940

INVENTOR
Richard O. Bender
BY
Pennie, Davis, Marvin & Edmonds
ATTORNEYS

Reissued July 21, 1942

Re. 22,136

UNITED STATES PATENT OFFICE 22,136

REFINING OF OIL

Richard O. Bender, Ridley Park, Pa., assignor to Sinclair Refining Company, New York, N. Y., a corporation of Maine Original No. 2,272,595, dated February 10, 1942, Serial No. 347,202, July 24, 1940. Application for reissue May 11, 1942, Serial No. 443,178

10 Claims. (Cl. 196—30)

Figure 1:
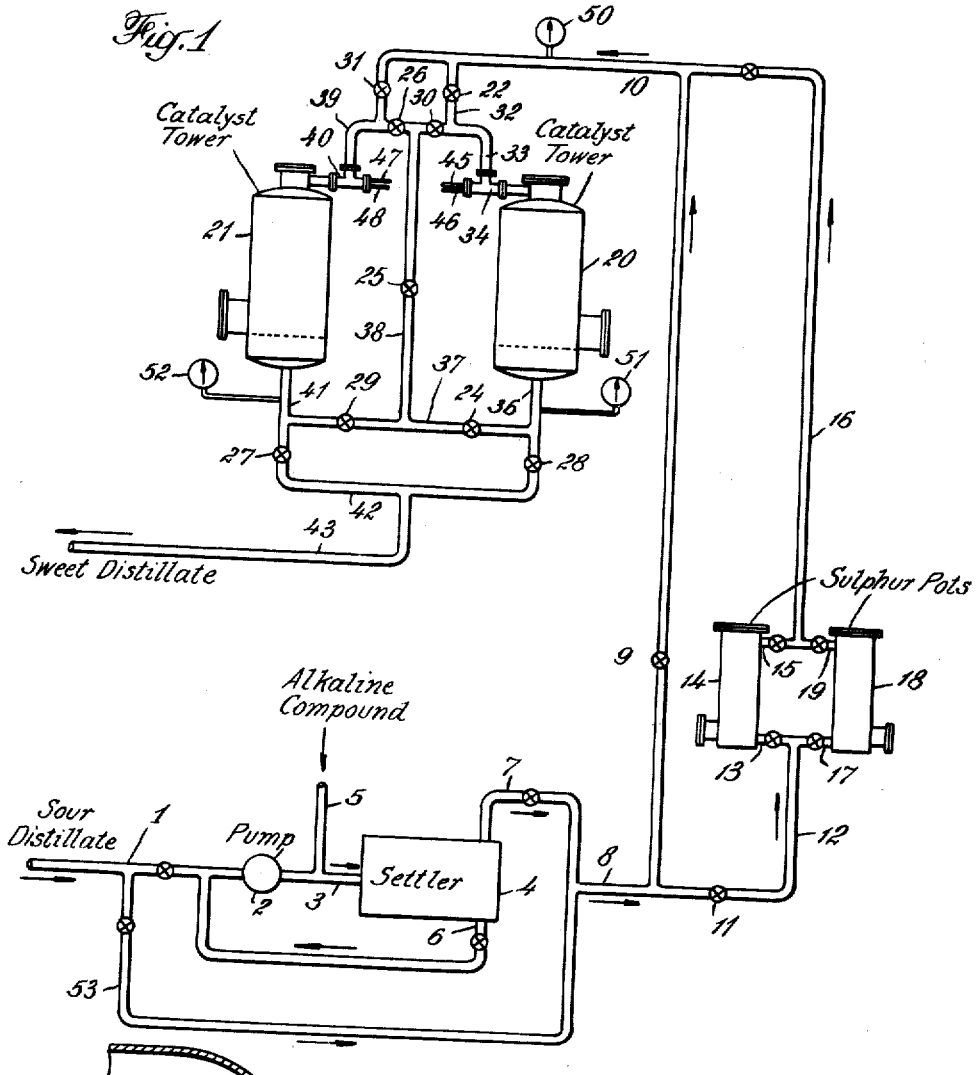

This invention relates to the refining of petroleum oils, and, more particularly, of light petroleum distillates such as kerosene and gasoline. The invention provides a novel process for removing undesirable sulphur compounds from such distillates which is especially useful in the treatment of very "sour" distillates such as polymer gasoline. This application is in part a continuation of my copending application Serial No. 300,439 filed October 20, 1939.

Light petroleum distillates contain undesirable sulphur compounds, such, for example, as mercaptans which impart to the distillates an objectionable odor and corrosiveness. These distillates, known as "sour" distillates, have been the object of a multitude of processes devised for the purpose of removing undesirable sulphur compounds from such distillates, an operation known as "sweetening." Treatment of sour distillates with sodium plumbite, the so-called doctor treatment, has been generally adopted in the art as the most efficient method of sweetening such distillates. The "doctor" treatment, however, requires the use of large volumes of aqueous treating solutions with attendant high losses of distillates and of expensive treating solutions, due to the formation of emulsions and to incomplete washing of treating solutions from treated distillates. Moreover, the handling of large volumes of such aqueous solutions requires a large labor force and further presents a serious problem during cold weather, and this problem has been characteristic of other sweetening operations employing large volumes of aqueous solutions.

More recently there have been attempts to sweeten sour distillates by processes which propose to avoid handling of substantial amounts of aqueous solutions, these processes being known as "dry" sweetening. Lead sulphide has been used heretofore as a catalyst in such dry sweetening processes utilizing elemental sulphur and free oxygen to remove the undesirable sulphur compounds from the distillates, but the methods hereinbefore attempted have been less efficient than the conventional doctor treatment and have been further characterized, as in the conventional doctor treatment, by a loss of anti-knock value, indicated for example by a decrease of at least ½ point in the octane number, in gasoline so treated.

I have found that undesirable sulphur compounds contained in a light petroleum distillate may be removed effectively and economically by incorporating in such a distillate elemental sulphur and an amount of an alkaline compound sufficient to render the distillate alkaline, and by then subjecting the alkaline distillate containing elemental sulphur to the action of a lead sulphide catalyst. This process is as effective as the conventional doctor sweetening without the disadvantages inherent in doctor sweetening and it does not reduce the anti-knock value of distillates such as gasoline.

I have found that in the treatment of very sour distillates it is desirable to introduce into the distillate prior to contact with the lead sulphide catalyst an alkali hydroxide in a quantity in excess of 100% of that theoretically required to maintain the distillate alkaline and also a limited amount of finely dispersed water, preferably introduced in the form of steam, as a washing agent. I have also found it to be desirable to contact the alkaline distillate with the lead sulphide catalyst in a plurality of successive stages, the majority of the mercaptans being converted in the first stage and the remaining more refractory mercaptans in a succeeding stage or stages.

I have discovered that contact between the distillate and the lead sulphide catalyst can be effected in the absence of free oxygen. Thus deliberate introduction of air, or the like, into the alkaline distillate charged to the catalyst bed is not required. The presence of adventitious air does not appreciably affect normal operation of my process. However, the presence of any appreciable quantity of air in the distillate tends to oxidize the lead sulphide catalyst thus requiring the use of "excess" sulphur in the untreated distillate to maintain the catalyst in the desired form of lead sulphide.

In carrying out my process the amount of elemental sulphur incorporated in the distillate should be substantially that amount of sulphur required theoretically to combine with the undesirable sulphur compounds contained in the distillate. I have found that an amount of sulphur substantially greater than that theoretically required, and herein referred to as "excess" sulphur, poisons the catalyst and should be avoided. Furthermore, the use of excess sulphur is undesirable in the treatment of gasoline because it effects a reduction in the anti-knock value of the gasoline under treatment.

Inasmuch as the mercaptans comprise the most important sulphur compounds to be eliminated from light distillates such as gasoline, the mercaptan content of such distillate serves as an index of the amount of sulphur required in my process. Thus the amount of sulphur which should be used in each instance will be that required to combine with the mercaptans contained in the distillate for the conversion of these mercaptans to the corresponding disulphides. This theoretical amount of sulphur required may be readily ascertained by conventional analysis. A substantial excess of elemental sulphur is objectionable both from the standpoint of its adverse effect in the sweetening operation and the undesirability of its presence in the finished gasoline. The prolonged use of excess sulphur materially shortens the life of the lead sulphide catalyst. However, I have found that the sensitivity of the catalyst to variations in the sulphur content and alkalinity of the sour distillate diminishes with an increase in the size of the catalyst vessel used.

I have found that lead sulphide deposited on saw-dust is an excellent catalyst which may be used with particular advantage although good results may also be obtained with a catalyst comprising lead sulphide deposited on carborundum or other carrier which sufficiently resists packing. A saw-dust carrier which I have found to be particularly advantageous comprises saw-dust classified to pass through a 10 mesh screen but sufficiently coarse not to pass through a 20 mesh screen. This carrier provides a large surface with attendant high catalytic efficiency. Furthermore the saw-dust carrier reduces the tendency to pack into a comparatively impervious bed. The lead sulphide may be deposited on the saw-dust carrier by admixing saw-dust wet with gasoline, with litharge (PbO) in such proportion that the litharge comprises about 35%–70%, or, as now preferred, about 40%–50% by weight of the mixture, then passing through a bed of this mixture in a suitable tower a charge of alkaline gasoline containing a substantial excess of elemental sulphur until the litharge is largely converted to lead sulphide as evidenced by the progressively increased sweetening of gasoline discharged from the bed. The catalyst thus produced, comprising lead sulphide deposited on saw-dust and containing about 30%–70% lead sulphide by weight, or about 40%–50% lead sulphide when starting with a mixture containing 40%–50% lead oxide, may then be used in the normal sweetening operation in which the use of excess sulphur in the gasoline charge is avoided. I have found, however, that the catalyst thus prepared usually does not remain active for a very long period but that after initial reactivation it is in condition to be used over long periods of activity between successive reactivations. Reactivation of spent catalyst may be effected by steaming the bed of catalyst for several hours, then washing the catalyst with water until substantially free from water soluble materials, removing and drying the catalyst, and subsequently replacing the catalyst in the catalyst tower. Increased reactivation of the catalyst may in some instances be provided by washing the replaced catalyst with acetone and displacing the acetone with gasoline so as to moisten the body of catalyst with gasoline. Although washing of the catalyst with acetone is not vital to successful operation of my sweetening process, it may increase, by 20%–25% in certain instances, the active period of the catalyst between successive reactivations. I have found that wetting of the saw-dust, in admixture with litharge or with lead sulphide (in the case of reactivated catalyst) with gasoline reduces packing of the saw-dust carrier during subsequent normal operation. To insure wetting of the dry catalyst with gasoline it is desirable first to fill the catalyst chamber with gasoline flashed from crude oil at 340° F. and 40 thus insuring thorough wetting.

The alkalinity of the distillate subjected to the action of the catalyst should be controlled so that a slight excess is always available. By excess alkalinity I mean that the sweetened distillate after treatment with the catalyst should be slightly alkaline, thus assuring the presence of a sufficient amount of alkaline compound after the catalyst treatment. For example, about 6–7 pounds of NaOH per thousand barrels of gasoline is usually satisfactory in the treatment of a heavy straight-run gasoline. About 12 pounds of NaOH per thousand barrels is ordinarily required for the treatment of depropanized straight-run gasoline flashed from crude oil at 340° F. and 40 pounds pressure. Similarly I have found that about 20 pounds of NaOH per thousand barrels may be used with advantage for the treatment of reformed straight-run gasoline while the amount of alkaline compound should be still further increased when treating very sour polymer gasolines. Alkalinity may be imparted to the gasoline by ammonia in the gaseous state or in the form of aqua ammonia, ammonia having the advantage of providing great flexibility in the control of the alkalinity of the distillate.

The desired alkalinity may be imparted to the distillate wholly or in part by a preliminary lye washing operation in accordance with conventional refinery practice. Excessive alkalinity reduces the activity of the catalyst by rendering it readily susceptible to wetting by moisture entrained in the gasoline and excessive wetting of the catalyst adversely affects the action of the catalyst. When several successive catalyst zones are employed in my process excessive alkalinity may be avoided by imparting limited alkalinity to the distillate in advance of each successive stage thus minimizing the proportion of alkaline compound present at the initial catalyst contact. Deficient alkalinity causes the catalyst to become poisoned thus requiring more frequent reactivation of the catalyst. However, I have found that a lead sulphide catalyst poisoned in this manner may be reactivated by pouring aqueous ammonia over the catalyst and then allowing it to stand for several hours before reuse.

The presence of excessive quantities of entrained moisture should be avoided in the alkaline distillate charged to the catalyst bed. The most advantageous amount of entrained moisture in a distillate to be treated by my sweetening process depends largely upon the character of the distillate and its treatment prior to sweetening by my process. The amount of moisture ordinarily entrained in sour gasoline is not detrimental. When treating a relatively sweet straight-run gasoline the amount of moisture should be kept at a minimum as moisture wets the catalyst bed causing it to pack and thus to impede the flow of gasoline through the catalyst bed. When treating such relatively sweet gasolines the rate of flow through the catalyst bed is advantageously maintained at a high rate. Therefore any considerable tendency of the catalyst bed to pack causes the pressure drop through the catalyst bed to become objectionably high in a period of time much shorter than that required to accumulate an objectionable deposit of sodium and ammonium salts in the catalyst bed. Initial treatment of a distillate with an aqueous caustic solution or aqueous ammonia may introduce into the distillate an excessive amount of water which should not be carried over into the catalyst bed particularly when treating relatively sweet distillates and for this reason adequate means should be provided for separation of such water from the alkaline distillate before it is charged to the catalyst when treating a distillate of this type.

On the other hand when treating very sour distillates, as for example polymer gasoline, a low rate of flow through the catalyst bed is required. Accordingly, the pressure drop due to packing of the catalyst bed is a less serious factor. In addition when treating such very sour stocks, water soluble salts, such as the salts produced by neutralization of $H_2S$ with NaOH, with ammonia, or with a mixture of NaOH and ammonia, accumulate in the catalyst bed at a rate sufficient to render the catalyst bed inactive in a period of time representing only a fraction of that required to produce objectionable packing of the catalyst bed in the substantially complete absence of moisture. Accordingly, when treating such very sour stocks it is advantageous to introduce a minor amount of finely dispersed aqueous NaOH or aqueous ammonia directly to the stock entering the catalyzing zone and even to add a minor amount of finely dispersed water at this point. Moisture thus supplied in limited quantities has the effect of washing accumulated water soluble salts from the catalyst bed and thus deferring termination of the sweetening operation occasioned by excessive accumulation of such salts in the catalyst bed. Any alkaline solution or water introduced into the stock entering the catalyzing zone must, however, be dispersed with extreme fineness in order to avoid the objectionable effects of wetting the catalyst bed. This may be accomplished with particular advantage by injecting an NaOH solution as a fine stream which is immediately dispersed with extreme fineness, or atomized, by an impinging steam jet.

The effectiveness of my sweetening process is not appreciably affected by variations in temperature and pressure. Therefore, it may be carried out with advantage at ordinary temperature and pressure although some improvement has been noted with the use of elevated temperatures. The maximum rate of charging alkaline distillate to the catalyzing zone may be readily determined by varying the charging rate under normal operating conditions. The charging rate is directly affected by the amount of undesirable sulphur compounds contained in the distillate. Increased size of the catalyst tower greatly increases the maximum charging rate. I have found, however, that prolonged operation with a charging rate to the catalyst tower substantially in excess of that which will permit proper sweetening of the distillate will soon poison the catalyst. The existence of this condition is indicated during normal operation by a rapid falling off of the maximum sweetening rate.

The conditions under which injection of caustic soda and moisture into the distillate entering the catalyzing zone are and are not desirable, and the effect of such injection, are well illustrated by the following comparisons.

When treating a relatively sweet straight-run depropanized gasoline and maintaining a high rate of flow through the catalyzing zone a number of operations embodying my process were carried out. In these operations the alkaline compound was first introduced into and admixed with the sour gasoline and the mixture then was permitted to settle before passing to the catalyzing zone in order to minimize the presence of moisture in the catalyzing zone. In each instance the process continued to sweeten the gasoline satisfactorily until termination of the operation became necessary due to excessive pressure drop through the catalyst bed caused by packing. However, this condition was not reached until the average throughput per run substantially exceeded 59,000 barrels of gasoline. When operating in this manner an increase in the moisture content of the mixture entering the catalyzing zone increased the tendency of the catalyst bed to pack, thus shortening the operation and the amount of distillate that could be sweetened per run.

On the other hand when treating a very sour polymer gasoline by the same procedure as that employed in the operations above described but maintaining that low rate of flow through the catalyzing zone which is essential to complete sweetening of the polymer gasoline, the activity of the catalyst bed became unsatisfactory for continued operation when the throughput reached a value of between 3,000 and 4,000 barrels of polymer gasoline. However, the pressure drop when this condition was reached was not objectionably high. When treating the same type of very sour polymer gasoline, but using two catalyst towers in series and introducing into the gasoline mixture entering the catalyzing towers NaOH in an amount slightly in excess of 100% of theoretical and a small amount of moisture supplied as steam to effect atomization of NaOH and moisture, the process continued to operate satisfactorily until the throughput exceeded 20,000 barrels of gasoline per tower.

Figure 2:
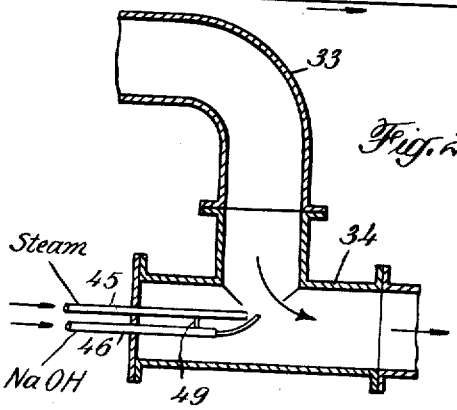

One arrangement of apparatus adapted to carry out my novel sweetening process is illustrated in the accompanying drawings in which Fig. 1 is a diagrammatic illustration of the relationship of the principal elements and of the path of the distillate and reagents therethrough, while Fig. 2 is a detailed view of one arrangement which has been found particularly useful for dispersing NaOH and moisture through the sour distillate entering the catalyzing zone.

The process of my invention will be further described in connection with these drawings. Referring to Fig. 1 a sour distillate, supplied through line 1, may be forced by pump 2 through line 3 into a settler 4. A controlled amount of alkaline compound, such, for example, as a solution of caustic soda, or dry or aqueous ammonia, or a mixture of both, is introduced into line 3 through line 5. The introduction of the mixture of alkaline compound and sour distillate into settler 4 permits separation of the alkaline compound and entrained water from the distillate, and any such material settling from the distillate may advantageously be returned through line 6 for reintroduction into line 3. The alkaline distillate removed from the top of settler 4 through line 7 is thus substantially free from entrained moisture. This alkaline distillate enters line 8 and in part flows through back pressure valve 9 to line 10. At least a portion of the alkaline distillate is by-passed around valve 9 through sulphur control valve 11 and thence through lines 12 and 13 into sulphur pot 14 containing elemental sulphur. Alkaline distillate containing dissolved sulphur leaves the top of sulphur pot 14 through line 15 and passes through line 16 to line 10 where it joins the distillate flowing through back pressure valve 9.

Alternatively alkaline distillate by-passed through sulphur control valve 11 may be discharged through line 17 into the duplicate sulphur pot 18 and discharged therefrom through line 19 to line 16; duplicate sulphur pots being provided to permit recharging of the pots with elemental sulphur without interruption of the sweetening process.

The alkaline distillate containing elemental sulphur which passes through line 10 then goes to the top of one of the catalyst towers 20 and 21.

In the arrangement shown two catalyst towers are provided and these catalyst towers are fitted with connections adapted to permit the alkaline sulphur-containing distillate to be passed downwardly through either of these towers separately, through both of them in multiple, or serially first through either one and then through the other. Each of the catalyst towers 20 and 21 is provided near the bottom with a perforated tray adapted to support the catalyst bed and with manheads arranged to permit removal of the catalytic material for reactivation. When it is desired to operate the towers 20 and 21 in series, valves 22, 24, 25, 26 and 27 are opened while valves 28, 29, 30 and 31 are closed. The sour gasoline then flows from line 10 through lines 32 and 33 into the upper end of the tower 20 and from the lower end of tower 20 through lines 36, 37, 38 and 39 to the upper end of tower 21. From the lower end of tower 21 the sweetened distillate is discharged through lines 41, 42 and 43. Pressure gauges 50, 51 and 52 advantageously are provided to permit observation of the pressure drops through the towers 20 and 21.

In passing from line 33 to the upper end of tower 20 the sour distillate passes through a T 34 which is illustrated in greater detail in Fig. 2. Through a flange on the one end of this T 34, there extends a steam line 45 and an alkali line 46.

As illustrative of one arrangement which has been found to give particularly satisfactory results in an apparatus in which line 33 and T 34 comprise a 4 inch line and 4 inch T, respectively, the steam line 45 may consist of a ¼ inch pipe which has been drawn closed at the discharge end and then drilled axially to provide a discharge aperture $\frac{1}{16}''$ in diameter. The alkali line 46 may similarly comprise a ¼ inch pipe to the discharge end of which is attached a ⅛ inch steel tube upwardly curved and terminating in a horizontal plane extending along the axis of the discharge aperture of steam line 45. A brace 49 is provided to maintain the discharge ends of conduits 45 and 46 in fixed relationship. This arrangement has been found especially adapted for introducing NaOH and moisture in limited amounts and in a very finely and uniformly dispersed state into the distillate flowing through line 33 and T 34. A limited amount of moisture, as steam, and NaOH are advantageously supplied in this manner particularly when treating very sour distillates, which require low throughput rates thus increasing the moisture tolerance. In fact when treating very sour distillates such that the moisture tolerance of the process is sufficiently high all of the alkalinity may be supplied in this manner. Under these conditions the sour distillate from line 1 may be by-passed to line 8 through line 53 and the functions of line 5 and settler 4 dispensed with entirely.

A T 40 with a steam line 47 and alkali line 48, similar in construction to T 34 and its associated steam and alkali lines 45 and 46, may be disposed in line 39 adjacent the inlet of tower 21. The steam and alkali lines 47 and 48 permit injection of finely dispersed moisture and alkali into the distillate entering tower 21 when tower 21 is being operated independently or in parallel with tower 20. When treating a moderately sour stock additional alkali need not be introduced at this point if towers 20 and 21 are being operated in series in the manner above described. However in the case of extremely sour distillates a part of the required total amount of alkali is injected at this point as it is desired to reduce the alkalinity in tower 20 and yet maintain the distillate in an alkaline condition throughout the period of catalyst contact.

It will be apparent that, although only two catalyst towers have been illustrated, additional catalyst towers may be used if desired and such additional catalyst towers may be operated in multiple with, or in series with, catalyst towers 20 and 21. Usually the progressively increasing pressure drop occasioned by the tendency of the catalyst bed to pack renders the use of more than two towers in series undesirable. When two towers have been operated in series until the distillate is no longer sweetened and it is found that the pressure drop has not as yet become objectionably high, a tower including a freshly reactivated charge of catalyst may be inserted in the #2 position and the sweetening operation continued using the partially spent catalyst previously employed in the #2 position in the #1 position.

The following specific examples will serve to further illustrate my invention as applied to various types of gasoline. Three groups of five runs each were carried out in apparatus of the type illustrated in the drawing using a single catalyst tower and under operating conditions which involved introduction of all of the alkaline compound through line 5. The first group of runs was applied to a moderately sour light gasoline flashed from crude oil of 340° F. and 40 pounds pressure and was subsequently depropanized in a tower where it was stripped under 200 pounds pressure while maintaining a temperature of 310°–315° F. in the depropanizer reboiler thereby producing a gasoline having a Reid vapor pressure of about 14–15 pounds. The second group of runs was applied to a moderately sour heavy gasoline which was obtained from a crude oil still and lye-washed before being charged to my sweetening operation. The third group of operations was applied to sour reformed gasoline which was obtained from a reforming still and then debutanized. The debutanized reformed gasoline was then passed directly to my sweetening process. The catalyst tower employed in all of the above-described operations had a capacity of about 9 cu. ft. The catalyst in each run consisted of a saw dust-lead sulphide mixture prepared as described above and containing about 30%–60% lead sulphide in its active condition. Acetone was used as above described for washing the catalyst during reactivation of the catalyst between runs and the presence of air into the treating operations was avoided so far as possible. The results of each of the three groups of runs above mentioned are given below in tabular form:

| Gasoline | Light gasoline | Heavy gasoline | Reformed gasoline |
|---|---|---|---|
| Total barrels gasoline treated | 238,507 | 298,816 | 75,121 |
| Total cubic foot catalyst | 47.5 | 34.91 | 23.81 |
| Total hours on stream | 2,486 | 3,098 | 1,505 |
| Total sulphur used ..... pounds | 717 | 1,307 | 512 |
| Average length of run ..... hours | 497 | 619 | 301 |
| Average barrels gasoline per cu. ft. of catalyst | 5,030 | 8,560 | 3,155 |
| Average barrels gasoline per run | 47,700 | 59,763 | 15,024 |
| Average cu. ft. catalyst per run | 9.5 | 6.98 | 4.72 |
| Lbs. sulphur per 1,000 bbls | 3.0 | 4.37 | 6.80 |
| Lbs. NaOH per 1,000 bbls | 12.15 | 6.57 | 20.25 |
| Lbs. $NH_3$ per 1,000 bbls | 1.35 | ..... | 0.164 |
| Lbs. acetone wash per run | 700 | 700 | 350 |

The treated gasolines were completely sweetened, as shown by the standard "doctor" test, and were non-corrosive as indicated by the "copper-strip" test.

The following additional specific example illustrates an application of my process in the sweetening of very sour polymer gasoline. A polymer gasoline having a mercaptan content of 0.025% was supplied through pipe 1 and bypassed through line 53 to line 8. A portion of this gasoline was diverted through one of the sulphur pots at a rate controlled to incorporate the predetermined quantity of elemental sulphur in the mixture passing through line 10. This mixture was passed serially through catalyst towers 20 and 21 each of which was charged with a catalyst bed containing 62 cu. ft. of the saw dust-lead sulphide catalyst previously described. All of the alkaline compound used in this operation was introduced into the polymer gasoline entering the catalyzing towers, a portion being introduced into T 34 adjacent the inlet of the first catalyzing tower and the remainder into T 40 adjacent the inlet of the second catalyzing tower. This was supplied through lines 46 and 48 as an aqueous NaOH solution of about 25° Bé. This NaOH was finely dispersed through the sour polymer gasoline by steam supplied through lines 45 and 47. Operating in this manner the process continued to satisfactorily sweeten the polymer gasoline for 300 hours during which time 12,000 bbls. of gasoline were passed through the apparatus. Upon substitution of a freshly reactivated catalyst bed in the second position and transfer of the partially spent catalyst bed from the second to first position the operation was resumed and continued to sweeten the polymer gasoline satisfactorily until an additional 12,000 bbls. had been passed through the system. During this period sulphur was used at an average rate of 30 pounds per thousand barrels of gasoline. The NaOH solution was supplied at an average rate sufficient to provide 70 pounds of NaOH per thousand barrels of gasoline. Steam was supplied at an average rate of 600 pounds per thousand barrels of gasoline.

If desired the preliminary alkaline treatment may be eliminated even when treating moderately sour distillates. The following specific examples is illustrative of such an operation. In this operation the stock treated was a kerosene distillate derived from a mixture of East Texas and Midcontinent crudes. Only one catalyst tower was employed, the catalyst bed having a a capacity of 120 cubic feet. The catalyst used was a saw dust-lead sulphide mixture which had previously been used in the process of my invention and had been regenerated without acetone washing in the manner above described. This catalyst contained 30–60% lead sulphide in its active condition. All of the alkalinity was obtained by dispersing, with steam, aqueous caustic soda and ammonium hydroxide into the stream of sour distillate entering the catalyst tower. The results obtained in this operation are given in the following table:

| | |
|---|---|
| Total bbls. gasoline treated | 274,274 |
| Total cubic foot catalyst | 120 |
| Total hours on stream | 1998 |
| Total sulphur used, lbs. | 898 |
| Average bbls. kerosene per cu. ft. catalyst | 2280 |
| Lbs. sulphur per 1000 bbls | 3.28 |
| Lbs. NaOH per 1000 bbls | .21 |
| Lbs. $NH_4OH$ per 1000 bbls | .77 |
| Lbs. water as steam per 1000 bbls | 5 |

Although lead sulphide is a particularly advantageous catalyst in the process of my invention, the sulphides of the polyvalent metals are generally useful as catalysts in the process. For example, mercuric sulphide, bismuth sulphide, arsenic sulphide, cupric sulphide, nickel sulphide and manganese sulphide can be used in place of lead sulphide in the sweetening process of my invention as previously described.

The cost of treating gasoline and other light distillates by the process of my invention is only a small fraction of the cost of treating such distillates by the conventional doctor treatment. The high emulsion and washing loses concomitant with conventional doctor treatment are eliminated and the required operating labor is materially reduced. My process also eliminates the necessity of handling large volumes of aqueous solution which are particularly difficult to handle during cold weather as found by common experience in heretofore conventional practice. In addition my process may be applied to gasolines without impairing their anti-knock properties.

I claim:

1. The method of removing undesirable sulphur compounds from a light petroleum distillate which comprises incorporating in the distillate an amount of elemental sulphur substantially equal to the amount of elemental sulphur required to combine with said sulphur compounds and an amount of an alkaline compound sufficient to render and maintain the distillate alkaline, and passing the alkaline distillate containing elemental sulphur in intimate contact with a lead sulphide catalyst in the absence of any substantial amount of free oxygen and undispersed water and in the presence of not more than a small amount of added finely dispersed water.

2. The method of removing undesirable sulphur compounds from a light petroleum distillate which comprises incorporating in the distillate an amount of elemental sulphur substantially equal to the amount of elemental sulphur required to combine with said sulphur compounds and an amount of an alkaline compound sufficient to render and maintain the distillate alkaline, and passing the alkaline distillate containing elemental sulphur in intimate contact with a catalyst comprising a sulphide of a polyvalent metal in the absence of any substantial amount of free oxygen and undispersed water and in the presence of not more than a small amount of added finely dispersed water.

3. The method of removing undesirable sulphur compounds from a light petroleum distillate containing a substantial quantity of such sulphur compounds which consists of incorporating in the distillate an amount of elemental sulphur substantially equal to the amount of sulphur required to combine with said sulphur compounds and an amount of an alkali hydroxide sufficient to render and maintain the distillate alkaline, and passing the alkaline distillate containing elemental sulphur in intimate contact with a lead sulphide catalyst in the absence of any substantial amount of free oxygen and undispersed water and in the presence of a small amount of added finely dispersed water.

4. The method of removing undesirable sulphur compounds from a light petroleum distillate which comprises incorporating in the distillate an amount of elemental sulphur substantially equal to the amount of sulphur required to combine with said sulphur compounds, passing the alkaline distillate containing elemental sulphur in intimate contact with a lead sulphide catalyst in a plurality of successive stages, said catalyst contact being effected in the absence of any substantial amount of free oxygen and undispersed water and in the presence of not more than a small amount of finely dispersed water, and incorporating in the distillate prior to each stage of contact with said catalyst an amount of an alkali hydroxide sufficient to maintain the distillate alkaline during the immediately following stages of catalyst contact.

5. The method of removing undesirable sulphur compounds from a light petroleum distillate which comprises incorporating in the distillate an amount of elemental sulphur substantially equal to the amount of sulphur required to combine with said sulphur compounds and an amount of alkaline compound sufficient to render and maintain the distillate alkaline, and passing the alkaline distillate containing elemental sulphur in intimate contact with lead sulphide deposited on saw-dust, said contact being effected in the absence of any substantial amount of free oxygen and undispersed water and in the presence of not more than a small amount of added finely dispersed water.

6. The method of removing undesirable sulphur compounds from a light petroleum distillate containing a substantial quantity of such compounds which comprises incorporating in said distillate an amount of elemental sulphur substantially equal to the amount of sulphur required to combine with said sulphur compounds, passing the resulting mixture in intimate contact with a lead sulphide catalyst in a catalyzing zone, finely dispersing through the sulphur containing distillate as it enters the catalyzing zone a small amount of water and an amount of an alkali hydroxide slightly in excess of that required to maintain said distillate in an alkaline condition throughout its contact with said catalyst, and maintaining the catalyzing zone free from undispersed water and any substantial amount of free oxygen.

7. In the treatment of a light petroleum distillate containing a substantial quantity of undesirable sulphur compounds for the removal of said sulphur compounds therefrom wherein a small amount of elemental sulphur and an amount of alkali hydroxide sufficient to render the distillate alkaline are incorporated in said distillate and the mixture then passed in contact with a lead sulphide catalyst in a catalyzing zone in the absence of any substantial amount of free oxygen and undispersed water, the improvement which comprises finely dispersing a minor amount of water through the distillate as it enters the catalyzing zone by injecting steam into said distillate.

8. In the treatment of a light petroleum distillate containing a substantial quantity of undesirable sulphur compounds for the removal of said sulphur compounds therefrom wherein a small amount of elemental sulphur and an amount of alkali hydroxide sufficient to render the distillate alkaline are incorporated in said distillate and the mixture then passed in contact with a lead sulphide catalyst in a catalyzing zone in the absence of any substantial amount of free oxygen and undispersed water, the improvement which comprises finely dispersing said alkali hydroxide and a minor amount of water through said distillate as it enters the catalyzing zone by introducing thereinto steam and said alkali hydroxide as impinging streams.

9. In the treatment of a light distillate containing a substantial amount of undesirable sulphur compounds for the removal of said sulphur compounds therefrom, the improvement which comprises incorporating a small amount of elemental sulphur in said distillate and passing the mixture in contact with lead sulphide deposited on saw-dust in a catalyzing zone, and finely dispersing through the distillate as it enters said catalyzing zone an amount of alkali hydroxide sufficient to render the distillate alkaline and a small amount of steam.

10. The method of removing undesirable sulphur compounds from a light petroleum distillate which consists of incorporating in the distillate an amount of elemental sulphur substantially equal to the amount of sulphur required to combine with said sulphur compounds and sodium hydroxide in an amount sufficient to render the distillate alkaline, passing the alkaline distillate containing elemental sulphur in contact with a catalyst comprising a sulphide of a polyvalent metal in the presence of not more than a small amount of finely dispersed water, and excluding from the catalyzing zone any substantial amount of free oxygen and undispersed water.

RICHARD O. BENDER.

CERTIFICATE OF CORRECTION.

Reissue No. 22,136. July 21, 1942.

RICHARD O. BENDER.

It is hereby certified that error appears in the printed specification of the above numbered patent requiring correction as follows: Page 2, first column, line 67, strike out "flashed from crude oil at 340° F. and 40" and insert instead --and then to introduce the dried catalyst--; and that the said Letters Patent should be read with this correction therein that the same may conform to the record of the case in the Patent Office.

Signed and sealed this 1st day of September, A. D. 1942.

Henry Van Arsdale,
Acting Commissioner of Patents.

(Seal)